(12) United States Patent
Kamijima

(10) Patent No.: US 7,557,994 B2
(45) Date of Patent: Jul. 7, 2009

(54) OPTICAL DEVICE, TRANSFER MOLD, AND IMAGE PICKUP APPARATUS

(75) Inventor: Shunji Kamijima, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/961,672

(22) Filed: Dec. 20, 2007

(65) Prior Publication Data

US 2008/0158687 A1 Jul. 3, 2008

(51) Int. Cl.
   *G02B 27/12* (2006.01)
   *G02B 27/10* (2006.01)
(52) U.S. Cl. ........................ 359/640; 359/626
(58) Field of Classification Search ......... 359/640–646, 359/619, 625–627, 263, 245
   See application file for complete search history.

(56) References Cited

U.S. PATENT DOCUMENTS 5,995,279 A   11/1999  Ogino et al.
6,643,067 B2 * 11/2003  Miyamae et al. ............ 359/619
7,113,341 B2  9/2006   Kamijima
7,327,519 B2  2/2008   Kamijima
2006/0082692 A1  4/2006  Kamijima et al.

FOREIGN PATENT DOCUMENTS

| JP | A-04-067010 | 3/1992 |
| JP | A-04-372925 | 12/1992 |
| JP | A-08-201729 | 8/1996 |
| JP | A-2005-037503 | 2/2005 |
| JP | A-2006-023378 | 1/2006 |
| JP | A-2006-126261 | 5/2006 |

* cited by examiner

*Primary Examiner*—Mohammed Hasan
(74) *Attorney, Agent, or Firm*—Oliff & Berridge, PLC

(57) ABSTRACT

An optical device includes a refracting surface refracting light, a flat surface transmitting light, and a prism group including prism elements having at least the refracting surface. Here, the prism elements are arranged with a plurality of pitches therebetween on a straight line parallel to a reference surface on which the prism elements are disposed.

11 Claims, 12 Drawing Sheets

PROCESS a

PROCESS b

PROCESS c

PROCESS d

PROCESS e

PROCESS f

OPTICAL DEVICE, TRANSFER MOLD, AND IMAGE PICKUP APPARATUS

BACKGROUND

1. Technical Field

The present invention relates to an optical device, a transfer mold, and an image pickup apparatus, and more particularly, to a technology of an optical device used for an image pickup apparatus.

2. Related Art

Digital video cameras that convert an incident light into an electrical signal by the use of an image pickup device and that store an image of a subject as digital data have been spread as an electronic apparatus using an image pickup device. The image pickup devices used in the digital video cameras have light-receiving elements regularly arranged to correspond to pixels. A moire may occur in an image recorded in the image pickup device due to the overlapping of a pixel structure of the image pickup device with a shape of a subject. The moire may occur at the time of reproducing an image due to the overlapping of a periodic structure of a reproducing apparatus for reproducing an image with the image. The moire allows colors or shapes not included in the original subject to appear, thereby causing a decrease in image quality. As a countermeasure against the moire, a technology using a low pass filter was known in the past. For example by using a birefringent plate such as a quartz plate splitting an incident light as the low pass filter, the periodicity of an image is reduced. In order to effectively reduce the periodicity of an image, it is preferable that the number of split lights obtained by splitting an incident light increases. The number of birefringent plates to be prepared for an incident light is "(the number of split lights)×2−1) and the birefringent plate corresponding to the distance by which the light is shifted need be prepared. Accordingly, since the more birefringent plates are required with an increase in the number of split lights, it is difficult to decrease in size of the image pickup apparatus, thereby causing an increase in cost. On the contrary, a technology using a diffraction grating as a low pass filter is disclosed in JP-A-4-372925. For example, a technology using an optical device diffracting light as a low pass filter is disclosed in JP-A-4-67010.

The diffraction grating disclosed in JP-A-4-372925 generates a second-order diffracted light or a third-order diffracted light which is an unnecessary high-order diffracted light in addition to a desired first-order diffracted light. In the optical device with a regular pattern like the configuration disclosed in JP-A-4-67010, an undesired diffracted light may be generated due to an effect of the low pass filter depending on the pitches of the optical device. The undesired diffracted light causes a blur of an image or a decrease in contrast.

SUMMARY

An advantage of the invention is that it provides an optical device which can effectively reduce a moire with a small-sized configuration and suppress the blur or the decrease in contrast, a transfer mold for manufacturing the optical device, and an image pickup apparatus using the optical device which has a small size and which can provide high image quality.

According to an aspect of the invention, there is provided an optical device including a refracting surface refracting light, a flat surface transmitting light, and a prism group including prism elements having at least the refracting surface. Here, the prism elements are arranged with a plurality of pitches therebetween on a straight line parallel to a reference surface on which the prism elements are disposed.

The light incident on the optical device is bent in a predetermined direction at the refracting face. When the prism elements having refracting faces inclined in direction different from each other are used, the light incident on the prism elements is split in plural directions. By splitting light in plural directions, it is possible to reduce an interference effect of light having a periodicity. The optical device can easily set the number of split lights, distances and directions in which light is split, and intensity of light to be shifted according to the configuration of the prism elements. Accordingly, it is possible to effectively reduce the moire even with a thin configuration. By arranging the prism elements in a straight line with plural pitches, it is possible to suppress unnecessary diffracted lights from occurring, as well as to reduce the interference effect of light. By using this configuration, it is possible to further reduce the moire and to suppress the blur or the decrease in contrast. Accordingly, it is possible to provide an optical device which can effectively reduce the moire with a small configuration and suppress the blur or the decrease in contrast.

At least one of the prism elements arranged in the straight line may be disposed in a direction different from that of at least one different prism element in the straight line. By making the directions of the prism elements different, it is possible to make more irregular the patterns for splitting the light by the use of the prism elements. Accordingly, it is possible to reduce the interference effect of light.

The prism elements may be arranged in a substantially concentric shape. According to this configuration, it is possible to arrange the prism elements irregular in the straight line on the reference surface. Accordingly, it is possible to arrange the prism elements in the straight line with plural pitches therebetween.

The prism elements may be arranged in a spiral shape. According to this configuration, it is possible to arrange the prism elements irregular in the straight line on the reference surface. Accordingly, it is possible to arrange the prism elements in the straight line with plural pitches therebetween.

The prism elements may have a plurality of the refracting faces which are inclined in directions different from each other. Here, the refracting faces may have substantially the same area. Accordingly, it is possible to split light into a substantially equivalent intensity.

The prism elements may be formed of a glass member. Accordingly, it is possible to obtain an optical device having an excellent optical performance in which deformation due to the warp or upset is small.

The prism elements may be formed of a resin member. Accordingly, it is possible to easily manufacture an optical device by the use of a mold transfer method using a transfer mold.

The optical device may further include a substrate formed of a glass member. Accordingly, it is possible to reduce the warp or upset of the optical device, thereby obtaining excellent optical performance.

The optical device may further include an infrared reducing member reducing a transmission of an infrared ray. Accordingly, it is possible to cut the infrared ray hindering the photographing operation, thereby obtaining an accurate image using a visible ray. Since it is not necessary to provide a configuration for cutting the infrared ray, it is possible to embody a simple configuration.

According to another aspect of the invention, there is provided a transfer mold having a shape of the above-mentioned optical device formed therein. It is possible to easily manufacture the optical device by the use of the mold transfer method using the transfer mold.

According to still another aspect of the invention, there is provided an image pickup apparatus including: an image pickup device having a plurality of light-receiving elements arranged in a matrix; an image picking lens guiding light to the image pickup device; and the above-mentioned optical device. Here, the optical device is disposed in an optical path between the image picking lens and the image pickup device. By using the optical device, it is possible to effectively reduce the moire with a small configuration and to suppress the blur or the decrease in contrast. Therefore, it is possible to obtain an image pickup apparatus which is small and which can provide high image quality.

The optical device may include a refracting face refracting light, a flat surface transmitting light, and a prism group including prism elements having at least the refracting face. Here, the prism elements may be arranged with respect to a position of the optical device corresponding to the center position of an iris. Accordingly, even with a variation of an iris, it is possible to obtain high image quality.

The optical device may include a refracting face refracting light, a flat surface transmitting light, and a prism group including prism elements having a plurality of the refracting faces inclined in directions different from each other. Here, the refracting face having substantially the same area may be formed every inclining direction in a unit area determined based on an F number of the image picking lens. Accordingly, it is possible to uniformly split lights from object points on a subject, thereby embodying high image quality for the entire photographed image.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described in detail with reference to the attached drawings.

First Embodiment

Figure 1:
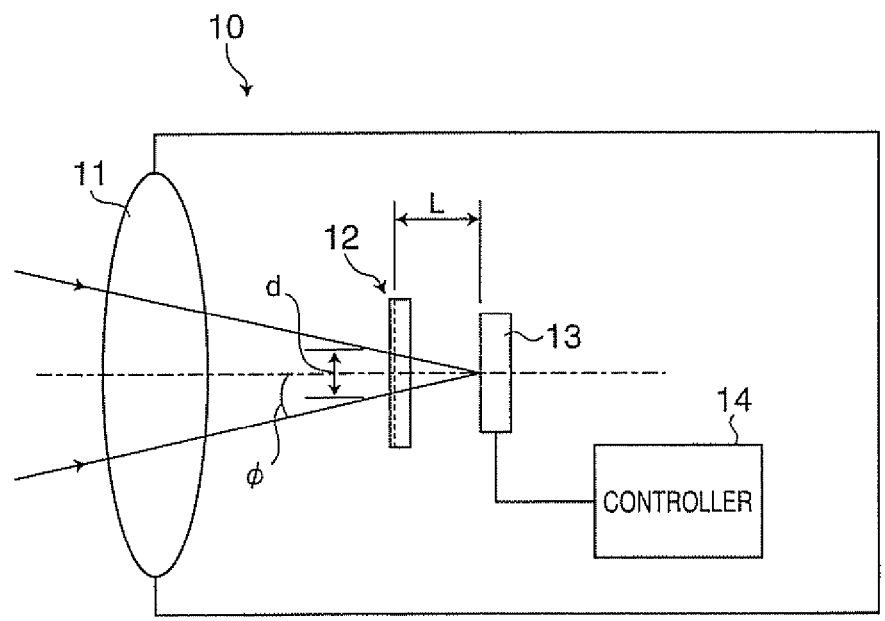
FIG. 1 is a diagram schematically illustrating a configuration of an image pickup apparatus according to a first embodiment of the invention.

FIG. 1 is a diagram schematically illustrating an image pickup apparatus 10 according to a first embodiment of the invention. The image pickup apparatus 10 converts an incident light into an electrical signal by the use of an image pickup device 13 and stores an image of a subject in digital data. An image picking lens 11 guides the incident light to the image pickup device 13. The optical device 12 is disposed in an optical path between the image picking lens 11 and the image pickup device 13. The light from the image picking lens 11 passes through the optical device 12 and then is incident on the image pickup device 13. The image pickup device 13 converts the incident light into electronic signals. The image pickup device 13 has a plurality of light-receiving elements (not shown) arranged in a matrix. For example, a CCD or a CMOS sensor can be used as the image pickup device 13. A controller 14 performs an arithmetic operation and a recording operation on the data from the image pickup device 13.

Figure 2:
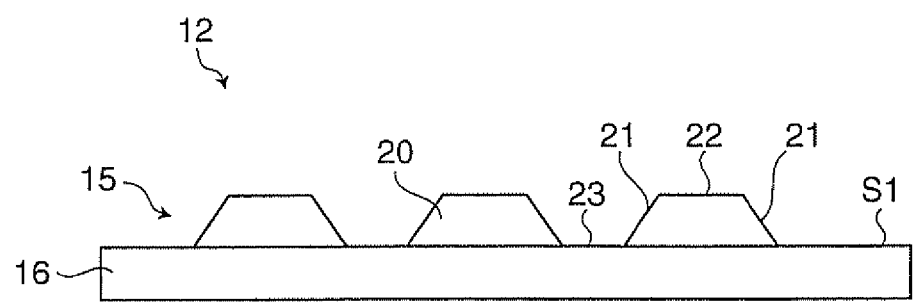
FIG. 2 is a diagram illustrating a sectional configuration of a main part of an optical device.

FIG. 2 is a diagram illustrating a sectional configuration of a main part of the optical device 12. The optical device 12 includes a prism group 15 and an IR absorbing glass 16. The prism group 15 includes plural prism elements 20 arranged on a reference surface S1. The reference surface S1 is a plane disposed on an incidence side of the IR absorbing glass 16. The prism elements 20 are formed of a glass member containing $SiO_2$. The optical device 12 can provide excellent optical performance with a small deformation due to bending or upset by the use of the prism elements 20 formed of the glass member. Each prism elements 20 has refracting surfaces 21 and a flat surface 22 disposed between the refracting surfaces 21. The refracting surface 21 refracts light. The prism plane 22 serves as a flat surface transmitting light.

Figure 3:
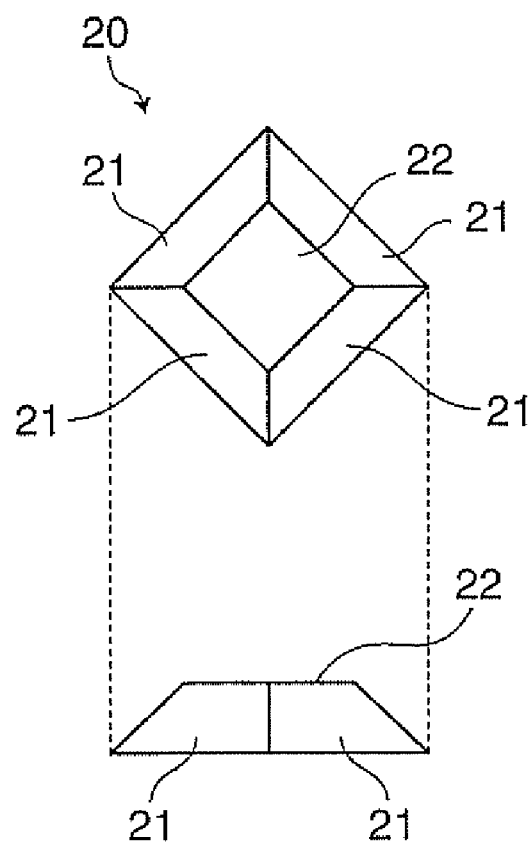
FIG. 3 is a diagram illustrating a top configuration and a lateral configuration of a prism element.

FIG. 3 is a diagram illustrating a top configuration and a lateral configuration of a prism element 20. The prism element 20 has a truncated pyramid obtained by cutting out and removing a portion including a vertex of a quadrangular pyramid with a plane parallel to the bottom surface. The prism plane 22 has substantially square shape. Four refracting surfaces 21 correspond to the sides of the square of the prism plane 22. Four refracting surfaces 21 are inclined in directions different from each other. Referring to FIG. 2 again, the prism elements 20 are arranged with intervals therebetween. Inter-prism planes 23 are formed between the prism elements 20 in the reference surface S1. The inter-prism planes 23 serve as flat surfaces transmitting light.

The IR absorbing glass 16 is a substrate formed of a glass member containing $SiO_2$, where a glass plate is coated with an IR cutting film. The optical device 12 can provide excellent optical performance with a small deformation due to the warp or upset, by the use of the IR absorbing glass 16 formed of the glass member. The IR cutting film is an infrared reducing member reducing the transmission of the infrared ray by absorbing the infrared ray. By disposing the IR absorbing glass 16, the infrared ray is cut out which hinders the image pickup operation, thereby obtaining an accurate image using a visible ray.

By disposing the IR absorbing glass 16 in the optical device 12, it is not necessary to particularly provide a configuration for cutting out the infrared ray, thereby embodying a simple configuration. Instead of providing the IR cutting film to the IR absorbing glass 16, a material absorbing an infrared ray may be added to the glass composition. The optical device 12 can be configured to include the prism group 15, or may be configured to include a substrate made of a transparent member. In the configuration including the infrared reducing member, the optical element may be independently provided.

Figure 4:
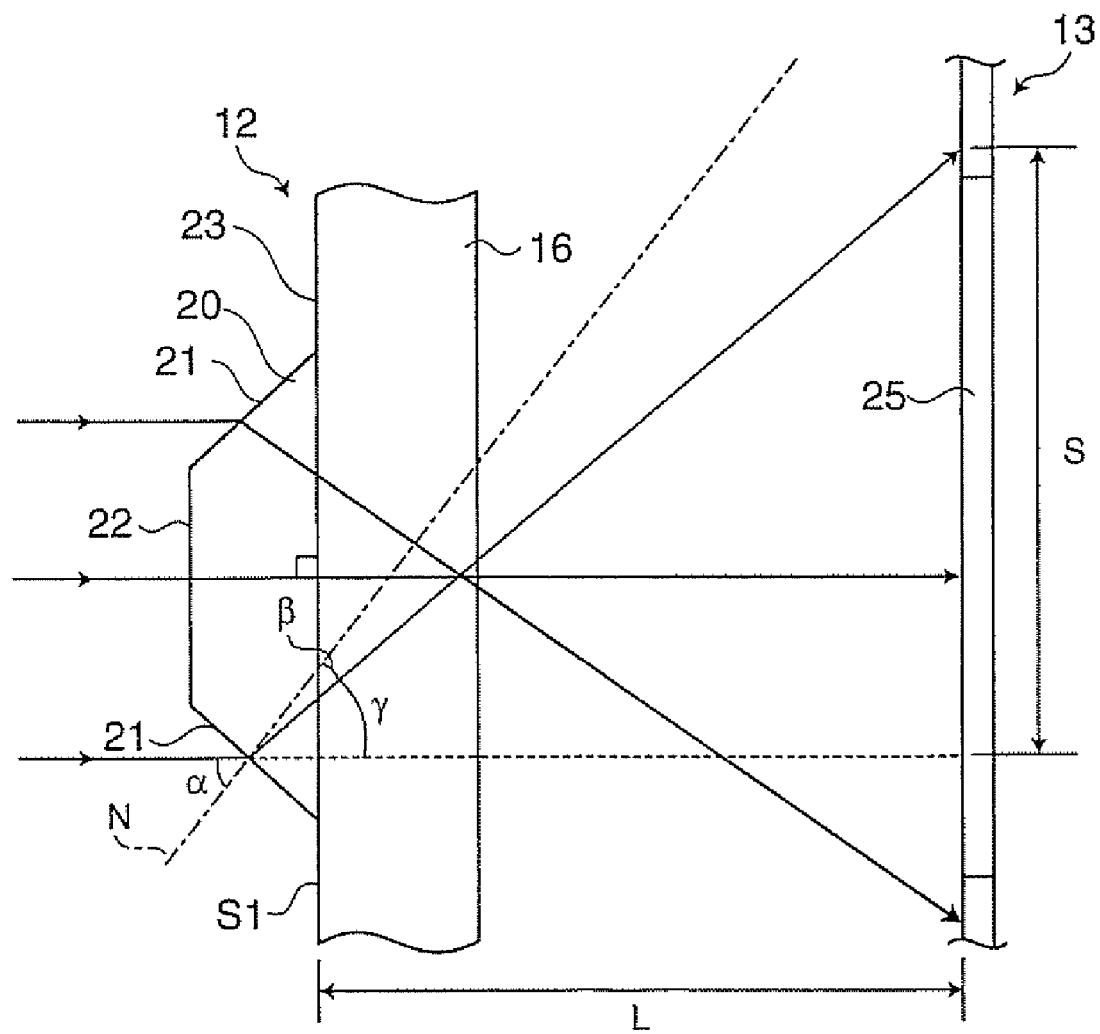
FIG. 4 is a diagram illustrating a refraction of light in the prism element.

FIG. 4 is a diagram illustrating refraction of light in the prism element 20. The refracting surfaces 21 all form an inclined angle θ about the reference surface S1. Here, a behavior of a parallel light incident on the prism element 20 will be described. The light incident on the prism plane 22 is incident at the right angle about the prim plane 22. The light incident on the prism plane 22 at the right angle travels straightly and enters light-receiving elements 25 of the image pickup device 13, without being refracted by the prism plane 22. On the contrary, the light incident on the refracting surface 21 is subjected to a refracting action satisfying the following expression:

$n2 \cdot \sin \beta = n1 \cdot \sin \alpha.$

Here, n1 denotes a refractive index of a medium (for example, air) right before being incident on the optical device 12 and n2 denotes a refractive index of the constituent member of the prism element 20. It is assumed that the prism element 20 and the IR absorbing glass 16 are formed of the same member and the refracting action does not occur in the boundary surface between the prism element 20 and the IR absorbing glass 16. The angle α is an incident angle about the normal line N of the refracting surface 21 and the angle β is an emission angle. When the light is allowed to travel straightly in the optical device 12 and is refracted, the shifted distances S of an incident position on the image pickup device 13 spaced by a distance L from the reference surface S1 are expressed by the following expressions:

$S = L \cdot \tan \gamma;$ and $\gamma = \alpha - \beta.$

In this way, by controlling the inclination angle θ of the refracting surface 21, it is possible to arbitrarily set the shifted distance S of the position on which the light is incident. By arbitrarily setting the shifted distance S, it is possible to allow the light to be incident on a different light-receiving element 25 adjacent to the corresponding light-receiving element 25, for example, when the light is allowed to travel straightly. The direction in which the light incident position is shifted depends on the directions of the refracting surfaces 21. By controlling the directions of the refracting surfaces 21, it is possible to arbitrarily the direction in which the light incident position is shifted. The light incident on the inter-prism plane 23 is incident to be perpendicular to the inter-prism plane 23. The light incident perpendicular to the inter-prism plane 23 travels straightly similarly to the light incident perpendicular to the prism plane 22 and is incident on the light-receiving element 25 of the image pickup device 13. FIG. 4 shows an example where the lights refracted by the refracting surfaces 21 opposed to each other in the prism element 20 intersect each other, but the refracted lights may not intersect each other by reducing the degree of refraction of the refracting surfaces 21. Even when the shifted distance S is small, it is possible to obtain a desired effect by uniformizing the light intensity distribution in the image pickup device 13. As shown in FIG. 4, the prism element 20 having the refracting surface 21 refracting light by a large angle can be easily formed in shape by the use of a mechanical processing.

The intensity of the light refracted by the refracting surface 21 depends on the area of the refracting surface 21. Four refracting surfaces 21 shown in FIG. 3 have substantially the same area. Accordingly, the four refracting surfaces 21 can refract light with substantially the same intensity. The optical device 12 splits light in plural directions by shifting the light in four directions by the use of four refracting surfaces 21 and allowing the light to travel straightly through the prism plane 22 and the inter-prism plane 23. By splitting light in plural directions, it is possible to reduce the interference effect having a periodicity. In this way, it is possible to easily set the number of split lights, the distances and directions in which light is split, and the intensity of the light to be shifted, on the basis of the configuration of the prism element 20. Accordingly, compared with a case where birefringent plates are used, it is possible to effectively reduce the moire with a thin configuration.

Figure 5:
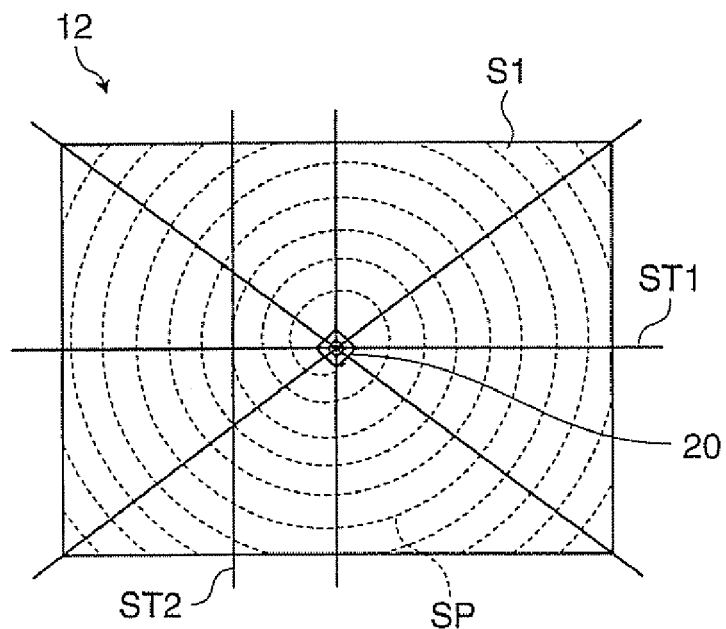
FIG. 5 is a diagram illustrating an arrangement of the prism elements.

FIG. 5 is a diagram illustrating an arrangement of the prism elements 20. The prism elements 20 are arranged in a curved line SP of a spiral shape with respect to the center position of the optical device 12 on the reference surface S1. In this way, the prism elements 20 are arranged in a spiral shape. Here, the prism elements 20 other than the prism element 20 located at the center position of the optical device 12 is not shown. The center position of the optical device 12 corresponds to the center position of an iris (not shown). The prism elements 20 are arranged with respect to the position corresponding to the center position of the iris.

Figure 6:
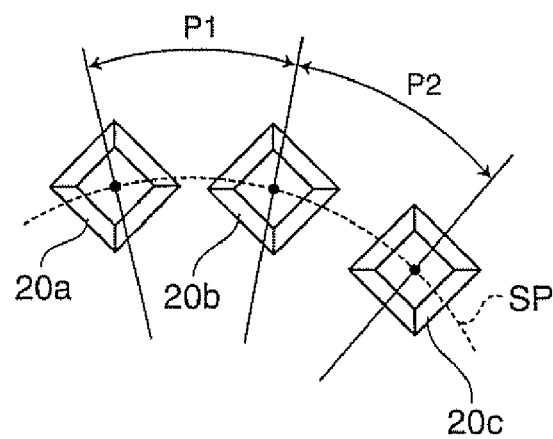
FIG. 6 is a diagram illustrating pitches of the prism elements in curved lines.

FIG. 6 is a diagram illustrating the pitches of the prism elements 20 in the curved line SP. Paying attention to three prism elements 20a, 20b, and 20c adjacent to each other in the curved line SP, the pitches P1 and P2 of the prism elements 20a, 20b, and 20c are substantially equal to each other. In this way, the prism elements 20 are arranged substantially at the same pitches in the curved line SP.

Referring to FIG. 5 again, paying attention to the straight line ST1 passing through the center position of the optical device 12, the positions at which the straight line ST1 and the curved line SP intersect each other are arranged at substantially the same pitch. When the prism elements 20 are arranged substantially at the same pitch in the curved line SP, some prism elements 20 are disposed at the positions at which the straight line ST1 and the curved line SP intersect each other and some prism elements are disposed at positions other than the intersecting positions. Accordingly, the prism elements 20 are arranged irregularly in the straight line ST1. In the straight line ST2 passing through a position other than the center position of the optical device 12, the positions at which the straight line and the curved line SP intersect each other exist with plural pitches. Some prism elements 20 are disposed at positions at which the straight line ST2 and the curved line SP intersect each other and some prism elements are disposed at positions other than the intersecting positions. The prism elements 20 are also arranged irregularly in the straight line ST2. In this way, the prism elements 20 are arranged in the straight line on the reference surface S1, that is, in the straight line parallel to the reference surface S1, with plural pitches. If the prism elements are arranged in the straight line parallel to the reference surface S1 with plural pitches, it means a state other than the state where the prism elements 20 are arranged in a predetermined straight line parallel to the reference surface S1 with a constant pitch.

By arranging the prism elements 20 in the straight line with the plural pitches, it is possible to reduce the interference effect of the light and also to suppress an unnecessary diffracted light from occurring. By using this configuration, it is possible to further reduce the moire and to suppress the blur or the decrease in contrast. Accordingly, it is possible to effectively reduce the moire with a small configuration and to suppress the blur or the decrease in contrast. By using the optical device 12, the image pickup apparatus 10 can embody high image quality with a small configuration.

By arranging the prism elements 20 with respect to the position corresponding to the center position of the optical device 12, it is possible to keep the optical characteristic obtained from the optical device 12 substantially constant even with the variation of the iris. Accordingly, it is possible to embody high image quality even with the variation of the iris. By arranging the prism elements 20 in the curved line SP with substantially the same pitch, it is possible to easily design a configuration in which the prism element 20 are arranged so that plural pitches exist in the straight line parallel to the reference surface S1. The prism elements 20 are enough if they are arranged in the straight line parallel to the reference surface S1 with plural pitches. The prism elements 20 may be arranged irregularly in the curved line SP. The gaps of the curved line SP may be substantially constant or irregular.

Referring to FIG. 1 again, when the image picking lens 11 of which the F number is F is used, the angle φ of light which can enter the image picking lens 11 can be expressed by the following expression:

$$\phi = a\sin(1/(2F)).$$

The light diffused at the angle φ from an object point on a subject passes through a circular region of the optical device 12 and is incident on an image point on the image pickup device 13 at the angle φ. The area of the circular region on the optical device 12 is used as a unit area. The optical device 12 has a configuration in which the prism elements 20 are arranged in at least the unit area with plural pitches. The diameter d of the circular region on the optical device 12 on which the light diffused at the angle φ is incident can be expressed by the following expression:

$$d = 2L \cdot \tan\phi.$$

Figure 7:
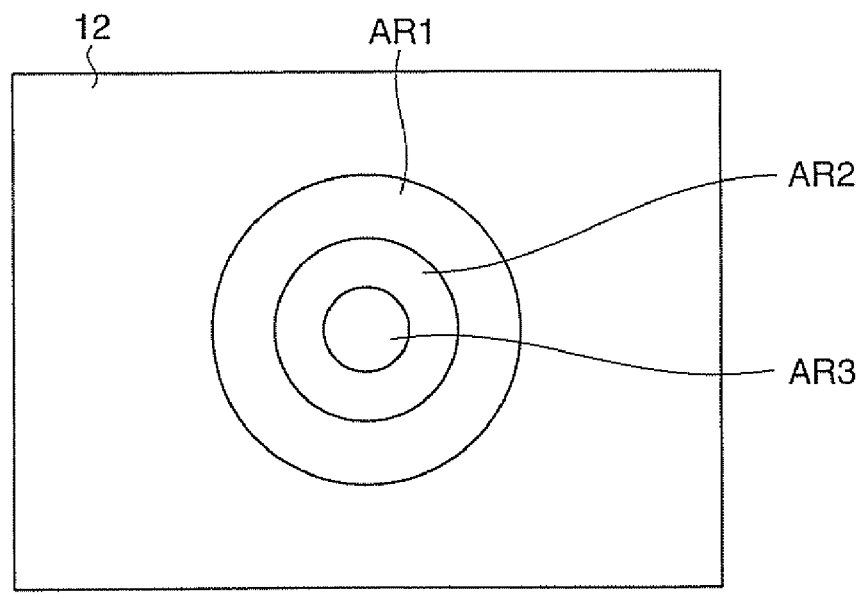
FIG. 7 is a diagram illustrating a relation between an F number and a unit area.

FIG. 7 is a diagram illustrating relation between the F number and the unit area. For example, when the F number is 1.2, the light from an object point passes through a first circular region AR1 on the optical element 12. When the F number is 8, the light from an object point passes through a second circular region AR2 smaller than the first circular region AR1. When the F number is 16, the light from an object point passes through a third circular region AR3 smaller than the second circular region AR2. In this way, the unit area is determined depending on the F number of the image picking lens 11. In the optical device 12, the refracting surface 21 having substantially the same area is formed every inclined direction in the unit area determined depending on the F number. The total area of the prism plane 22 as a flat surface and the inter-prism plane 23 (see FIG. 2) and the total area of the refracting surfaces 21 are substantially equal to each other in any unit area. Accordingly, it is possible to uniformly split the light from the object points on the subject, thereby embodying the high image quality of the whole image.

Figure 8:
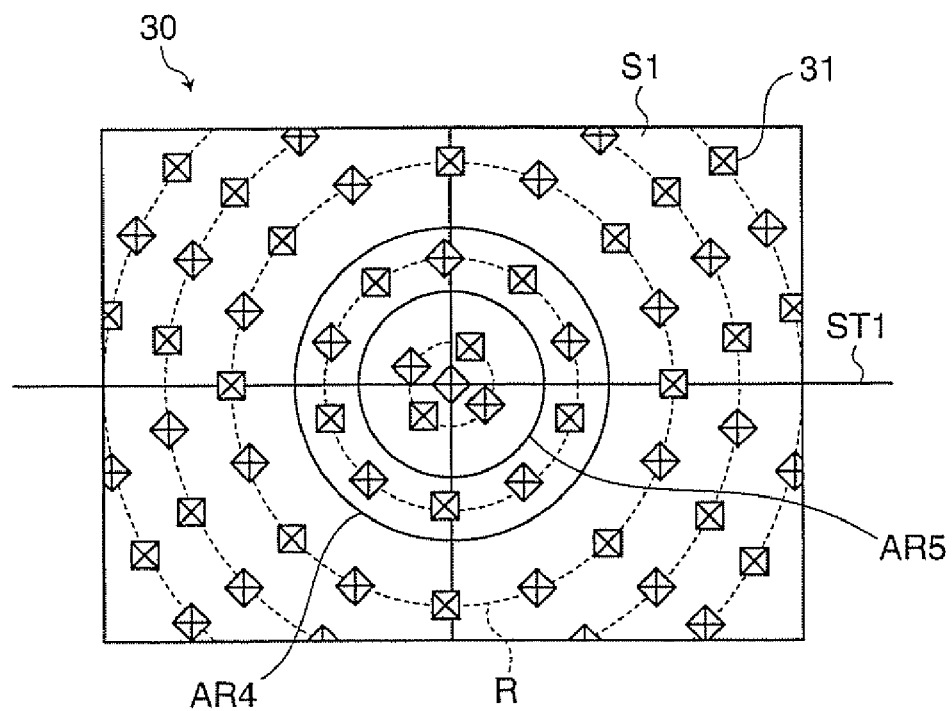
FIG. 8 is a diagram illustrating a top configuration of an optical device according to a modified example of the first embodiment.

FIG. 8 is a top configuration of an optical device 30 according to a modified example of this embodiment. The optical device 30 according to this modified example includes prism elements 31 arranged substantially concentrically on the reference surface S1. The prism elements 31 are arranged in concentric circles R centered on the center position of the optical device 30 on the reference surface S1. The prism elements 31 are arranged with substantially the same pitch in the concentric circles R. In this modified example, the prism elements 31 are arranged with plural pitches on a straight line parallel to the reference surface S1. The gaps between the concentric circles R may be constant or irregular.

Figure 9:
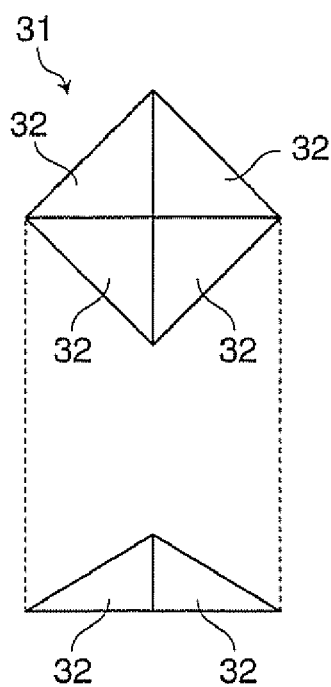
FIG. 9 is a diagram illustrating a top configuration and a lateral configuration of a prism element.
Figure 10:
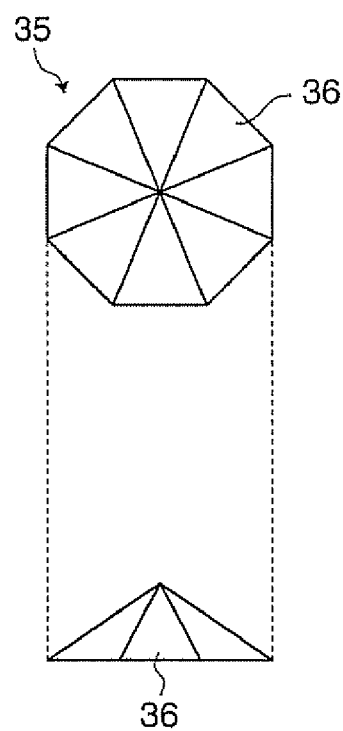
FIG. 10 is a diagram illustrating a prism element according to a modified example.
Figure 11:
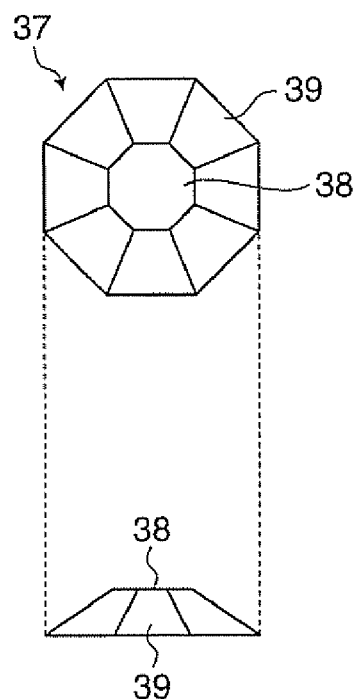
FIG. 11 is a diagram illustrating a prism element according to a modified example.

FIG. 9 is a diagram illustrating a top configuration and a lateral configuration of a prism element 31. The prism element 31 has a quadrangular pyramid shape having four refracting faces 32. The four refracting faces 32 are inclined in directions different from each other. The optical device 30 does not have any flat surface in the prism elements 31, but the inter-prism planes are formed between the prism elements 31 arranged with gaps therebetween.

Referring to FIG. 8 again, four sides of the rectangular shape of some prism elements 31 are arranged to be substantially parallel to four sides of the rectangular shape of the optical device 30 and four sides of the rectangular shape of some prism elements are arranged to be inclined at about 45 degrees about four sides of the rectangular shape of the optical device 30. In the optical device 30, the prism elements 31 having different directions are arranged alternately in the concentric circles R. In the straight line parallel to the reference surface S1, for example, the straight line ST1 passing through the center position of the optical device 30, at least one of the prism elements 31 is disposed in a direction different from that of at least different one of the prism elements 31 in the straight line.

By disposing the prism elements 31 in different directions, it is possible to make the patterns for splitting light by the use of the prism elements 31 further irregular. Accordingly, it is possible to reduce the interference effect of the light. The optical device 30 is not limited to the configuration in which the prism elements 31 having different directions are alternately arranged in the concentric circles R. At least one prism element 31 having a direction different from that of another prism element can be arranged in the straight line parallel to the reference surface S1 and the prism elements 31 having different directions may be randomly arranged in the concentric circles R.

For example, a first circular region AR4 and a second circular region AR5 located inside the first circular region AR4 both have a circular shape centered on the center position of the optical device 30. Here, in the first circular region AR4 and the second circular region AR5, the refracting faces 32 having substantially the same ratio are formed in the inclining directions. In this way, in the concentric circular regions of the optical device 30, the refracting faces 32 having substantially the same ratio are formed in the inclining directions. The total area of the inter-prism planes as flat surfaces and the total area of the refracting faces 32 have substantially the same ratio in any circular region. In this configuration, even with a variation of an iris, it is possible to make the optical characteristic obtained by the optical device 30 substantially constant. Accordingly, even with the variation of the iris, it is possible to embody high image quality.

FIGS. 10 to 13 show modified examples of the prism elements. The prism element 35 shown in FIG. 10 has an eight-sided pyramid having eight refracting faces 36. The eight refracting faces 36 are inclined in directions different from each other. The prism element 35 shifts light in the eight directions. The prism element 37 shown in FIG. 11 has a truncated pyramid shape obtained by cutting and removing a portion including a vertex of an eight-sided pyramid with a plane parallel to the bottom surface. The prism plane 38 is a flat surface having an octagonal shape. The eight refracting faces 39 are disposed to correspond to the sides of the octagonal shape of the prism plane 38. The prism element 37 allows light to travel straightly through the prism plane 38 and shifts the light in the eight directions by the use of the eight refracting faces 39.

Figure 12:
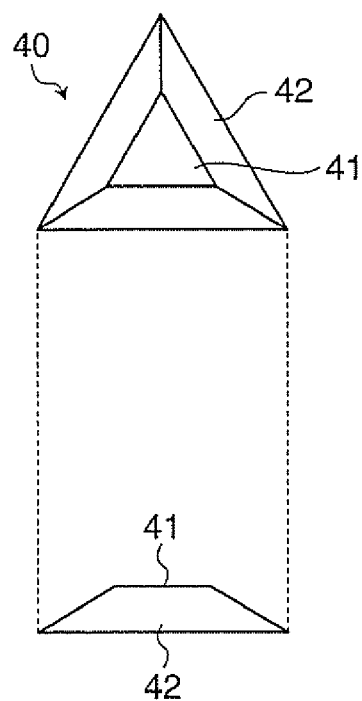
FIG. 12 is a diagram illustrating a prism element according to a modified example.

The prism element 40 shown in FIG. 12 has a truncated pyramid shape obtained by cutting and removing a portion including a vertex of a three-sided pyramid with a plane parallel to the bottom surface. The prism plane 41 is a flat surface having a triangular shape. Three refracting faces 42 are disposed to correspond to the sides of the triangular shape of the prism plane 41. The prism element 40 allows light to travel straightly through the prism plane 41 and shifts the light in three directions by the use of the three refracting faces 42.

Figure 13:
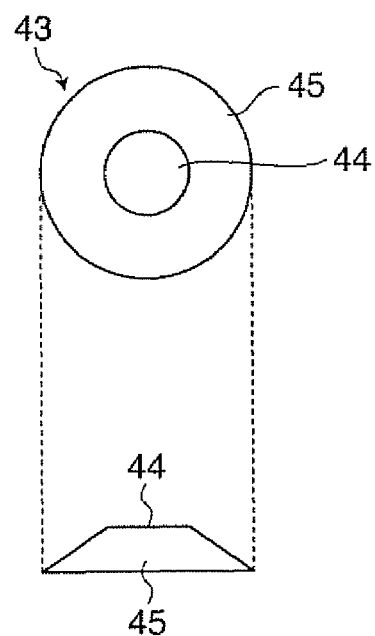
FIG. 13 is a diagram illustrating a prism element according to a modified example.

The prism element 43 shown in FIG. 13 has a truncated pyramid shape obtained by cutting and removing a portion including a vertex of a cone with a plane parallel to the bottom surface. The prism plane 44 is a flat surface having a circular shape. The refracting face 45 is formed along the circumference of the prism plane 44. The prism element 43 allows light to travel straightly through the prism plane 44 and diffuses the light in a direction in which it goes apart from the center of the prism plane 44 by the use of the refracting face 45.

When the prism elements (for example, the prism element 31 shown in FIG. 9 or the prism element 35 shown in FIG. 10) having only the refracting faces are used, the inter-prism plane can be formed between the prism elements. When the prism elements including the refracting faces and the prism planes are used, the inter-prism planes may be provided like the optical device 12 (see FIG. 2) or the inter-prism planes may be omitted. The prism elements are sufficient as long as they have at least a refracting face and may have a shape other than the shapes described in this embodiment. The prism elements may employ various variations using the number of faces, directions, areas, inclined angles of the refractive faces as parameters. The prism elements may be formed in a concave shape, in addition to the convex shape like this embodiment.

Second Embodiment

Figure 14:
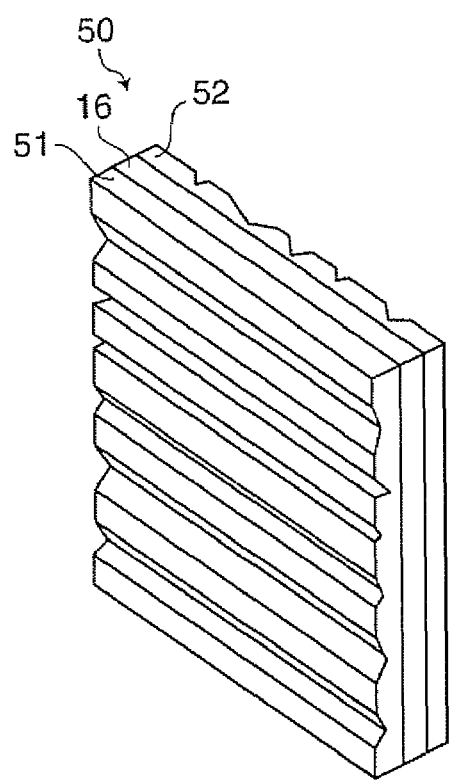
FIG. 14 is a perspective view schematically illustrating an optical device according to a second embodiment of the invention.

FIG. 14 is a perspective view schematically illustrating an optical device 50 according to a second embodiment of the invention. The optical device 50 according to this embodiment can be applied to the image pickup apparatus 10 according to the first embodiment. The optical device 50 includes a first prism group 51 and a second prism group 52. The first prism group 51 is disposed on one surface of the IR absorbing glass 16. The second prism group 52 is disposed on a surface of the IR absorbing glass 16 opposite the surface on which the first prism group 51 is formed.

Figure 15:
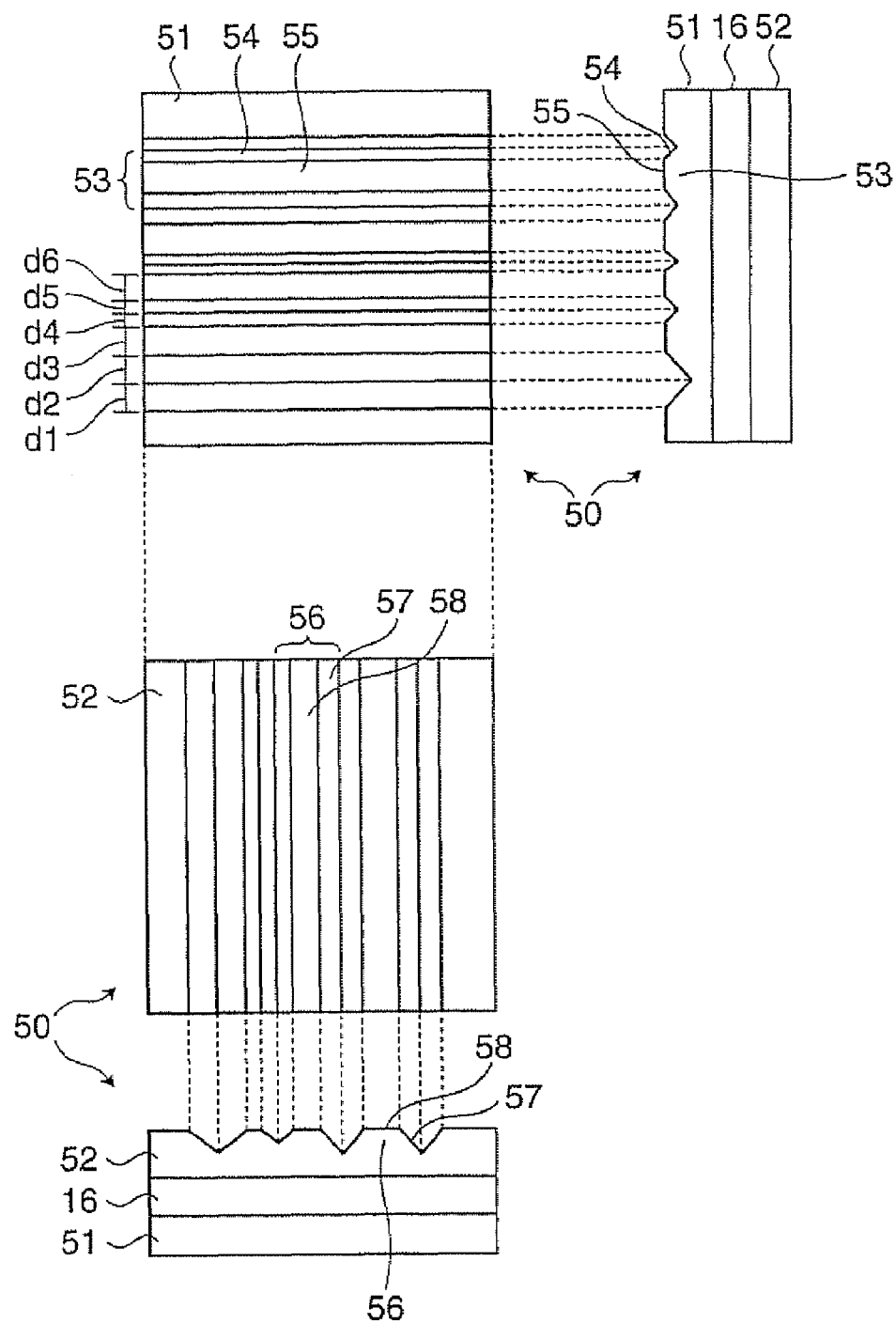
FIG. 15 is a diagram illustrating configurations of a first prism group and a second prism group.

FIG. 15 is a diagram illustrating a configuration of the first prism group 51 and the second prism group 52. The prism elements 53 of the first prism group 51 are disposed on a surface of a glass panel opposite the IR absorbing glass 16. The prism elements 53 are formed substantially parallel to each other. Each prism element 53 has two refracting faces 54 and a plane 55. The prism element 53 is configured by forming a groove, which has a V-shaped section, in the panel. The refracting faces 54 form the side surfaces of the groove. The plane 55 includes portions other than the portion in which the grooves are formed in the panel. The planes 55 are all formed substantially at the same height.

Among the refracting faces 54 with widths d1, d2, d4, and d5 forming the prism elements 53 adjacent to each other and the planes 55 with widths d3 and d6, the refracting faces 54 forming a groove are formed with the same width (d1=d2, d4=d5). The refracting faces 54 of the adjacent grooves have different widths (d2≠d4). The planes 55 of the adjacent prism elements 53 have different widths (d3≠d6). These shapes can be obtained by randomly forming the depth and pitch of the grooves. In this way, the prism elements 53 of the first prism group 51 are arranged with plural pitches in the arrangement direction of the prism elements 53. The arrangement direction of the prism elements 53 is a direction of a straight line parallel to the reference surface in which the prism elements 53 are arranged. The reference surface is a face substantially parallel to the plane 55. The first prism group 51 is formed so that the angles formed by the refracting faces 54 and the planes 55 are substantially constant in any prism element 53.

The prism elements 56 of the second prism group 52 are disposed on the surface of a glass panel opposite the surface close to the IR absorbing glass 16. The prism elements 56 are substantially parallel to each other. Each prism element 56 has two refracting faces 57 and a plane 58. The prism elements 56 of the second prism group 52 are arranged substantially perpendicular to the prism elements 53 of the first prism group 51. The prism elements 56 of the second prism group 52 are configured similarly to the prism elements 53 of the first prism group 51, except that the arrangement direction is different. The prism elements 56 of the second prism group 52 are arranged with plural pitches in the arrangement direction of the prism elements 56.

The prism element 53 of the first prism group 51 allows light to travel straightly through the plane 55 and shifts light in two directions by the use of two refracting faces 54. The prism element 56 of the second prism group 52 allows light to travel straightly through the plane 58 and shifts light in two directions by the use of two refracting faces 57. Three split lights split into three by the prism element 53 of the first prism group 51 are further split into three by the prism element 56 of the second prism group 52 and thus the optical device 50 splits light into nine split lights in total.

In this embodiment, by arranging the prism elements 53 and 56 in the straight line with plural pitches, it is possible to reduce an interference effect of light and also to suppress an unnecessary diffracted light from occurring. In this embodiment, it is possible to effectively reduce the moire with a small configuration and to suppress the blur or the decrease in contrast. The optical device 50 is not limited to the configuration in which the prism elements 53 of the first prism group 51 and the prism elements 56 of the second prism group 52 are substantially perpendicular to each other, but may have a configuration in which both form an angle other than the right angle.

The optical device 50 may have any configuration as long as the prism elements 53 and 56 are arranged therein with plural pitches at least in the width of the unit area. It is preferable that the prism elements 53 and 56 are random in pitch and width in the width of the unit area. In the first prism group 51 and the second prism group 52, a block having random pitch and random widths may be repeatedly arranged in the width of the unit area. By repeatedly arranging the block having the same structure, it is possible to easily manufacture the optical device 50.

The optical device 50 may have a configuration in which the first prism group 51 and the second prism group 52 are directly bonded to each other. The optical device 50 may have a configuration in which the surface of the panel on which the first prism group 51 is formed is opposed to the surface on which the second prism group 52 is formed, or a configuration in which the plane side of the panel is opposed to the first prism group 51 or the second prism group 52. In the optical device 50, the first prism group 51 may be formed on one surface of the panel and the second prism group 52 may be formed on the surface of the panel opposite the surface on which the first prism group 51 is formed.

The prism elements 53 and 56 may have any shape other than the shapes described in this embodiment as long as they have at least a refracting face. For example, the height of the plane may be irregularly changed. By forming trapezoidal grooves instead of the V-shaped grooves, inverted shapes of the shapes of the prism elements 53 and 56 according to this embodiment may be formed.

Figure 16:
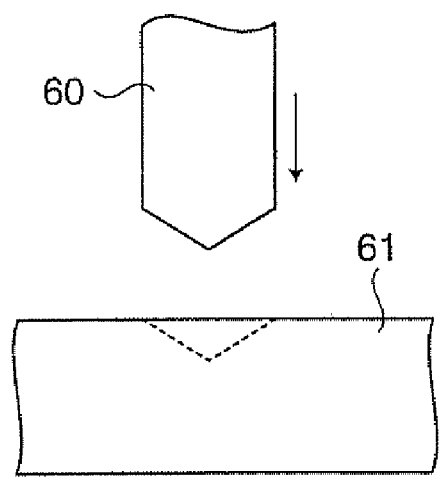
FIG. 16 is a diagram illustrating a method of manufacturing an optical device by the use of a cutter.

A method of manufacturing the optical devices according to the first and second embodiments will be described now. The prism elements of the optical device can be formed by cutting the substrate 61 by the use of a cutter 60, as shown in FIG. 16. It is possible to manufacture the optical device having the V-shaped grooves by the use of the V-shaped cutter 60. It is possible to form the prism elements having a desired shape depending on the shape of the cutter 60. By pivoting the cutter 60 about the tip of the cutter 60, it is possible to form a groove having a desired width.

Figure 17:
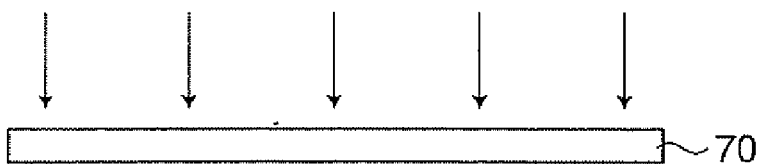
FIG. 17 is a diagram illustrating a procedure of manufacturing an optical device using a gray scale lithography process.
Figure 17:
Figure 17:
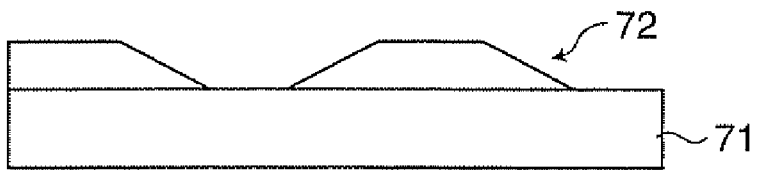
Figure 17:

FIG. 17 is a diagram illustrating a procedure of manufacturing the optical device by the use of a gray scale lithography process. The gray scale lithography process employs a gray scale mask 70 in which the transmittance is gradually varied in a predetermined region. In process a, a resist layer 72 applied on a substrate 71 is exposed using the gray scale mask 70. Next, in process b which is a lithography process, a prism shape corresponding to the transmittance of the gray scale mask 70 is transferred to the resist layer 72.

In process c, the prism shape formed in the resist layer 72 is transferred to the substrate 71. A dry etching method such as an RIE method can be used for the etching process. Accordingly, the prism elements 73 can be formed on the substrate 71. A wet etching process may be performed after the dry etching process. Accordingly, by smoothing the unevenness of the processed surface, it is possible to obtain a configuration which can reduce unnecessary scattered lights.

Figure 18:
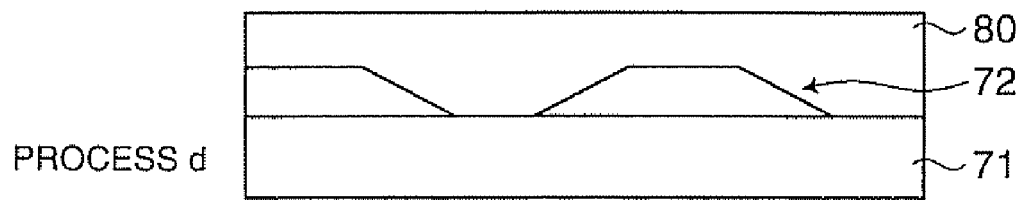
FIG. 18 is a diagram illustrating a procedure of manufacturing an optical device using a mold transfer process.
Figure 18:
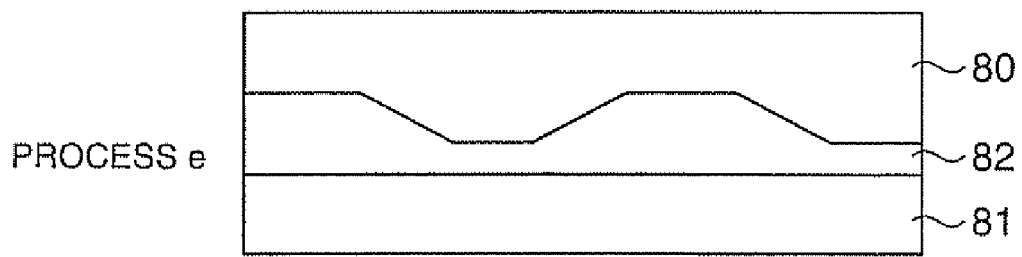
Figure 18:
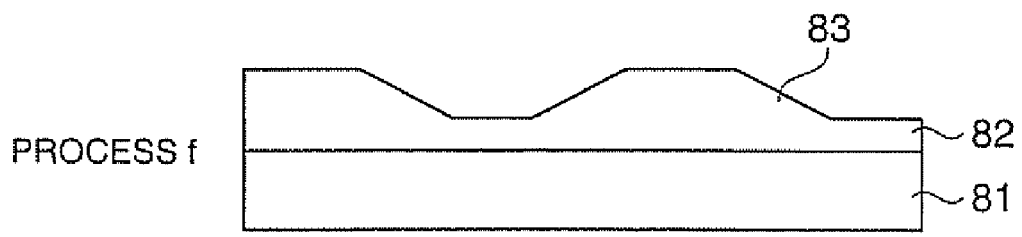

FIG. 18 is a diagram illustrating a procedure of manufacturing an optical device by the use of a mold transfer. In process d, a mold 80 is made by performing the Ni plating process on the resist layer 72 to which the prism shape is transferred. The mold 80 is a transfer mold in which the shape of the optical device is formed. When the prism shape formed in an insulating member such as the resist layer 72 is used as a mother die, the conductive coating is formed on the prism forming portions. The conductive coating can be formed by the use of a vacuum deposition method of Si, Ni, and Al, a silver mirror reaction, and an electroless Ni plating method. After conductivity is given by forming a conductive member, the electric plating of Ni or the like is performed on the prism shaped portions.

Next, in a mold transfer process shown by process e, a mold 80 is pressed against the resin layer 82 formed on a substrate 81. Accordingly, as shown by process f, the prism elements 83 can be formed on the resin layer 82. By employing the mold 80, it is possible to easily manufacture a large amount of replica. Therefore, it is possible to easily manufacture the optical device. The mold 80 is not limited to the case where it is formed based on the shape formed in the resist layer 72. For example, the mold may be formed based on the shape formed using the cutting of the cutter.

The image pickup apparatus according to the embodiment of the invention can be widely used for an electronic apparatus having a photographing function, such as a digital video camera, a digital camera, a television phone, a personal computer, a mobile phone as a portable information instrument, and a PDA.

As described above, the optical device according to the embodiment of the invention can be suitably used for an image pickup apparatus.

The entire disclosure of Japanese Patent Application No. 2006-351210, filed Dec. 27, 2006 is expressly incorporated by reference herein.

What is claimed is:

1. An image pickup apparatus, comprising:
   an image pickup device having a plurality of light-receiving elements arranged in a matrix;
   an image picking lens guiding light to the image pickup device; and
   an optical device comprising:
      a refracting surface refracting light;
      a flat surface transmitting light; and
      a prism group including prism elements having at least the refracting surface,
      the prism elements being arranged with a plurality of pitches therebetween on a straight line parallel to a reference surface on which the prism elements are disposed;
   the optical device being disposed in an optical path between the image picking lens and the image pickup device.

2. The optical device of claim 1, wherein at least one of the prism elements arranged in the straight line is disposed in a direction different from that of at least one different prism element in the straight line.

3. The optical device of claim 1, the prism elements being arranged in a substantially concentric shape.

4. The optical device of claim 1, the prism elements being arranged in a spiral shape.

5. The optical device of claim 1, the prism elements having a plurality of the refracting surfaces which are inclined in directions different from each other, and
the refracting surfaces having substantially the same area.

6. The optical device of claim 1, the prism elements being formed of a glass member.

7. The optical device of claim 1, the prism elements being formed of a resin member.

8. The optical device of claim 1, further comprising a substrate formed of a glass member.

9. The optical device of claim 1, further comprising an infrared reducing member reducing a transmission of an infrared ray.

10. The image pickup apparatus of claim 1, the optical device including a refracting surface refracting light, a flat surface transmitting light, and a prism group including prism elements having at least the refracting surface, and
the prism elements being arranged with respect to a position of the optical device corresponding to the center position of an iris.

11. The image pickup apparatus of claim 1, the optical device including a refracting surface refracting light, a flat surface transmitting light, and a prism group including prism elements having a plurality of the refracting surfaces inclined in directions different from each other, and
the refracting surface having substantially the same area being formed in every inclining direction in a unit area determined based on an F number of the image picking lens.

* * * * *

UNITED STATES PATENT AND TRADEMARK OFFICE
CERTIFICATE OF CORRECTION

PATENT NO. : 7,557,994 B2  Page 1 of 1
APPLICATION NO. : 11/961672
DATED : July 7, 2009
INVENTOR(S) : Shunji Kamijima It is certified that error appears in the above-identified patent and that said Letters Patent is hereby corrected as shown below:

Title page (30) Foreign Application Priority should read as follows:

December 27, 2006  (JP) ....................2006-351210

Signed and Sealed this

Fifteenth Day of September, 2009

David J. Kappos
*Director of the United States Patent and Trademark Office*